United States Patent [19]

Hamilton

[11] Patent Number: 4,523,083

[45] Date of Patent: Jun. 11, 1985

[54] BEVERAGE WARMER

[75] Inventor: William H. Hamilton, Seattle, Wash.

[73] Assignee: Hamilton-Dunn Research Co., Seattle, Wash.

[21] Appl. No.: 596,063

[22] Filed: Apr. 2, 1984

Related U.S. Application Data

[63] Continuation-in-part of Ser. No. 288,113, Jul. 29, 1981, abandoned.

[51] Int. Cl.³ .............................................. F27D 11/02
[52] U.S. Cl. ..................... 219/433; 206/818; 219/432; 219/435; 219/449; 219/452; 219/464; 219/519; 219/521; 335/205
[58] Field of Search ............... 219/10.49, 432, 433, 219/434, 435, 438, 441, 452, 449, 464, 446, 512, 518, 519, 521, 523; 126/390; 206/818; 215/100 R; 220/69; 273/239; 335/205, 207, 209

[56] References Cited

U.S. PATENT DOCUMENTS

| | | | |
|---|---|---|---|
| 2,543,052 | 2/1951 | Park | 219/433 |
| 2,568,474 | 9/1951 | Van Sciver | 335/205 X |
| 2,640,907 | 6/1953 | Morey | 219/435 |
| 2,660,658 | 11/1953 | Wagner et al. | 219/518 X |
| 2,804,535 | 8/1957 | Tuttle | 219/433 |
| 3,052,791 | 9/1962 | Jacobs et al. | 219/435 |
| 3,267,256 | 8/1966 | Blanding et al. | 219/446 |
| 3,305,805 | 2/1967 | Tann | 335/205 |
| 3,576,426 | 4/1971 | Sesholtz | 219/523 |
| 3,586,824 | 6/1971 | Barney | 219/452 |
| 3,695,842 | 10/1972 | Mintz | 219/433 X |
| 4,153,833 | 5/1979 | Fischer et al. | 219/449 |
| 4,165,456 | 8/1979 | Dogliotti | 219/435 X |
| 4,274,070 | 6/1981 | Thiene | 335/205 |
| 4,317,016 | 2/1982 | Ito | 219/10.49 R |

Primary Examiner—Volodymyr Y. Mayewsky
Attorney, Agent, or Firm—Hopgood, Calimafde, Kalil, Blaustein & Judlowe

[57] ABSTRACT

A beverage warmer assembly comprising a support unit having an electrically heated surface on which a beverage-container unit such as a cup may rest, the container unit and the support unit having magnetically coacting elements so mounted to the respective units that a switch is (a) connected for electrical heating of the surface for one orientational relation of container-unit seating on the surface and (b) is inoperative for a different orientational relation of container-unit seating on the surface.

33 Claims, 19 Drawing Figures

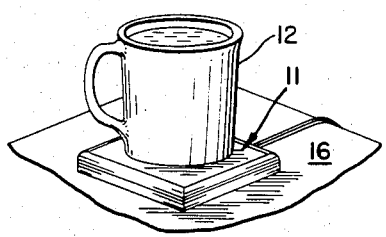
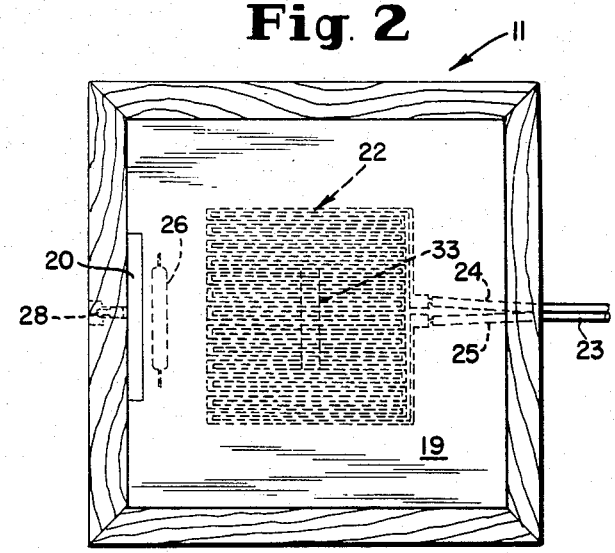
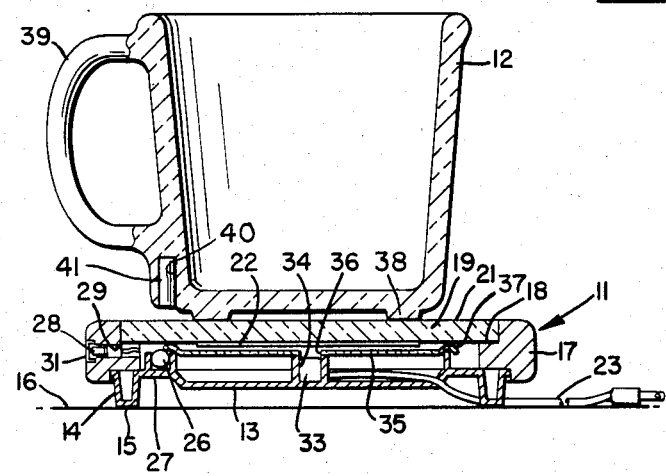
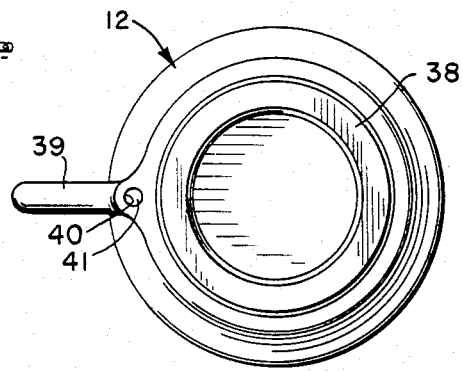
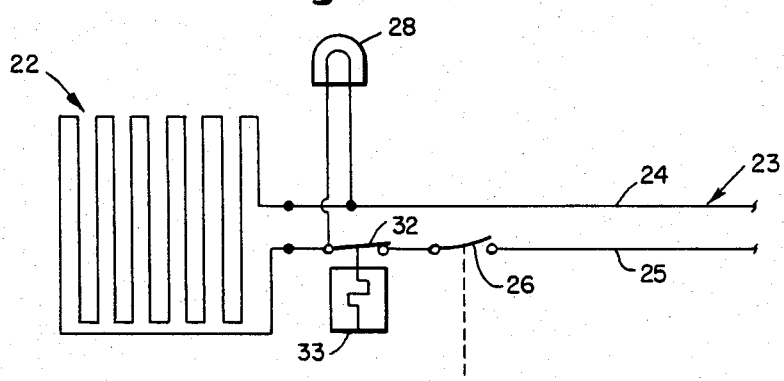

BEVERAGE WARMER

This application is a continuation-in-part of my copending application Ser. No. 288,113, filed July 29, 1981, now abandoned.

The invention relates to apparatus for selectively warming a beverage and particularly to apparatus consisting essentially of a supporting heating unit and a separate container unit adapted to be seated on it and having cooperating arrangements whereby only predetermined orientation of the container unit on the heating unit energizes the heating unit.

PRIOR ART

It is known to provide beverage warmers wherein the weight of a container with liquid in it automatically energizes an electrically heated surface on which the container is supported, as for example disclosed in the patents to Wagner et al No. 2,660,658 and Barney No. 3,586,824. Electric hot plates are known wherein a heat-sensitive element acts to limit energization when a predetermined temperature is attained, as in the patent to Fischer et al No. 4,153,833. Beverage warmers containing magnetic stirring devices are known as disclosed in the patent to Jacobs et al No. 3,052,791.

The patent to Moreland et al No. 3,796,850 discloses a cooking pan and heater arrangement wherein a metal or other magnetic material pan is heated by indirect heating controlled by the presence of the pan on the heater. In this patent, the circuit to the induction coils includes a magnetic-reed switch having contacts held normally closed by a pair of permanent magnets on the heater and allowed to open to energize the coils when a pan of magnetic material is placed to the heater and shunts the magnetic field.

OBJECTS OF THE INVENTION

The invention is specifically concerned with the novel combination of an electrically energized heating unit that provides support for a special coacting beverage container unit, with the heating unit having a control circuit which will automatically energize the heating unit only in response to predetermined orientation of the container unit on the heating unit, and this is a major object of the invention.

Another object is to achieve the above object via magnetic coaction between component elements of both units.

A specific object is to meet the foregoing objects utilizing a normally open magnetic switch fixedly mounted to the heating unit.

A general object is to meet the above objects with basically simple structure which is economical to manufacture and to operate, and which is safe and foolproof in use.

In a prefered embodiment, the invention achieves these objects in a novel combination of a special heater unit with a special container, such as a cup for beverage to be warmed while seated on the heater unit, the container material being non-magnetic, but having a magnetic element locally fixed thereto. The heater unit includes a heating surface for seated support of the container unit, and a magnetic switch in the container unit is responsive to energize the heater unit only upon predetermined placement or orientation of the container on the heating surface, there being an absence of such a response (i.e. no energizing of the heater unit) for a different placement or orientation of the container on the heating surface.

DETAILED DESCRIPTION

The invention will be described in detail for preferred and other embodiments, in conjunction with the accompanying drawings, in which:

FIG. 1 is a perspective view showing a beverage warmer of the invention in use;

FIG. 2 is an enlarged plan view showing the heating unit of the beverage warmer of FIG. 1, according to a first embodiment;

FIG. 3 is a section showing detail of the beverage warmer of FIG. 2 with a beverage container mounted thereon, the section being taken at 3—3 in FIG. 2;

FIG. 4 is a schematic view showing the electrical circuit and control;

FIG. 5 is a bottom plan view of the container or cup of FIG. 3;

Figure 12:
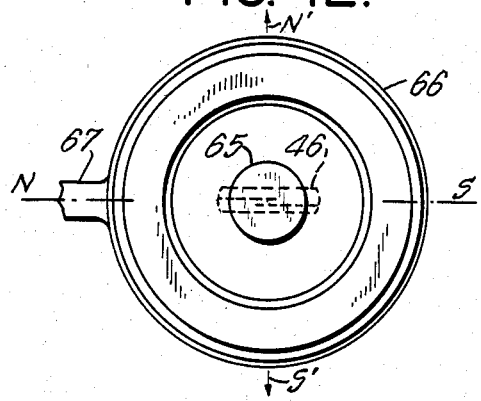
FIG. 12 is a bottom plan view similar to FIG. 11, to illustrate another embodiment of the container unit.
Figure 14:
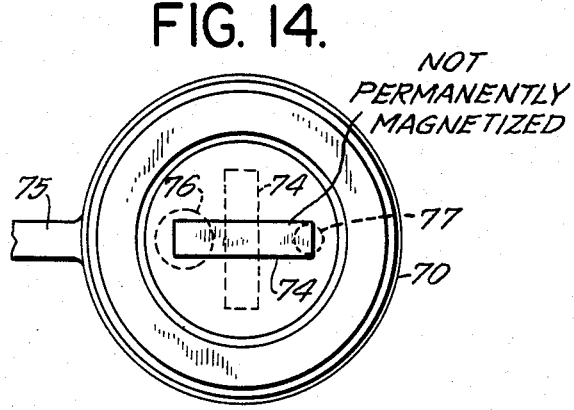
FIG. 14 is a bottom plan view similar to FIGS. 11 and 12 to illustrate still another embodiment of the container unit.
Figure 15:
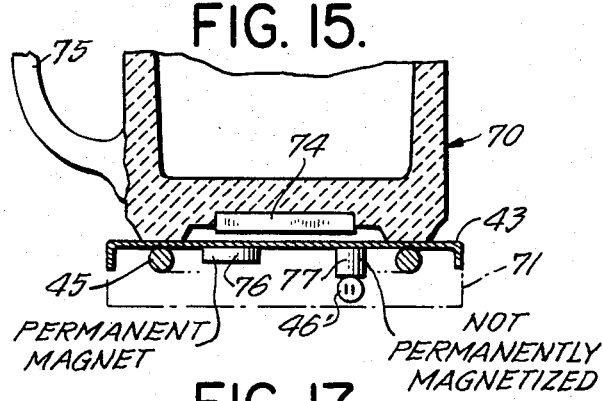
Figure 16:
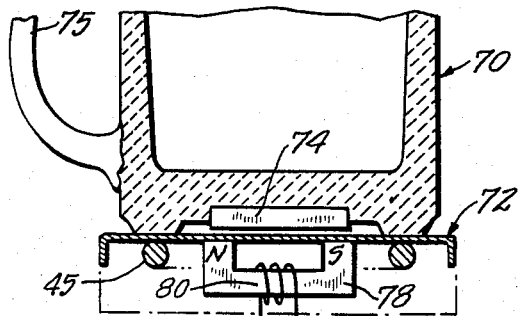
Figure 17:
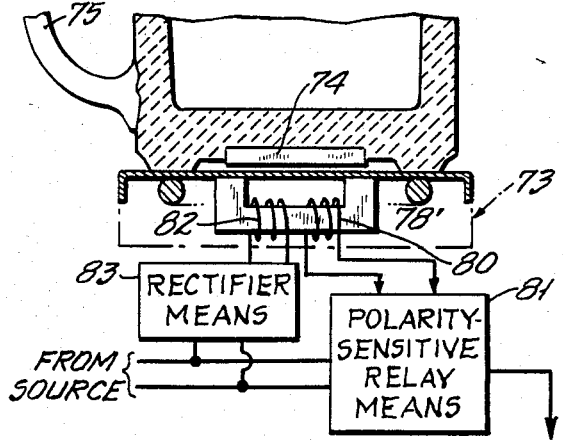
Figure 18:
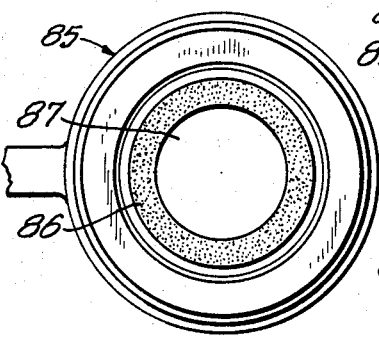
Figure 19:
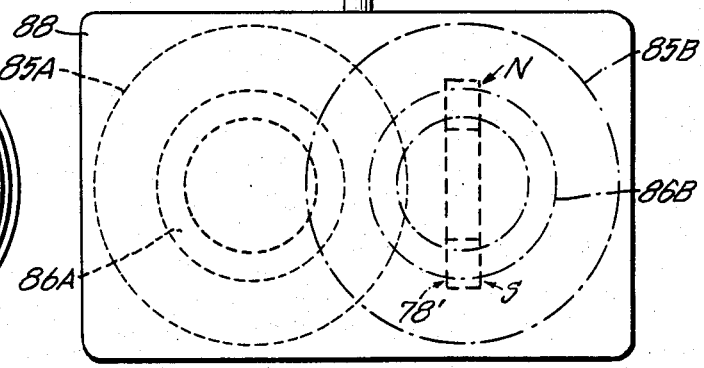

FIGS. 15, 16, and 17 are fragmentary vertical sections of the container unit of FIG. 14, with schematic illustration of coacting parts of different embodiments of the associated base unit; and FIGS. 18 and 19 correspond to FIGS. 12 and 14, to show another modification.

FIG. 1 shows a beverage-warmer heating unit of the invention, with a seated container 12 of liquid beverage such as coffee.

As shown, the heating unit 11 comprises a rigid base 13 having a depending rim 14 around its outer periphery, rim 14 having a flat lower surface 15 lying in a plane whereby the unit may seat evenly on a flat topped table 16 or the like.

A frame 17 which may be of plastic or wood extends around and is seated on the outer peripheral portion of the base, preferably projecting a small distance outwardly with respect to rim 14. The inner periphery of frame 17 is recessed at 18 to seat a flat plate 19 of ceramic, glass or other non-magnetic material. The upper surface 21 of plate 19 is smooth and planar, and this is the heating surface that supports the beverage container unit 12, as will appear.

A heating element 22 is secured upon or immediately adjacent the flat bottom surface of plate 19. As shown in FIGS. 2 and 3, the heating element is centered with plate 19 and comprises an assembly of heating resistors arranged to impart heat to plate 19 over a considerable part of its area, for example about half, and this heat is transmitted to a larger uniform area of surface 21.

Current for heating element 22 is provided by an electrical cord 23 containing the input wires 24 and 25 of FIG. 2. The electrical circuit essentially comprises wires 24 and 25 connected to heating element 22 through an on-off switch 26 which here is a magnetic-reed switch and (as seen in FIG. 3) is mounted in an upwardly open compartment 27 in a predetermined location on base 13. Switch 26 is normally biased to the off or open-circuit position shown in FIG. 4.

An indicator lamp 28 is connected electrically across the circuit and is seated in an outwardly open side recess 29 in frame 17, the recess preferably being closed by a transluscent plastic or glass cover 31, usually red.

The electrical circuit may if desired include a normally closed switch 32 connected to a temperature-responsive unit 33 that is located centrally of the base in an upwardly open compartment 34.

A layer or sheet of heat-insulating or heat-reflecting material (indicated at 35) is provided on the base at least coextensively with and below heating element 22, this layer preferably being apertured as at 36 in alignment with the temperature sensitive unit 33, for exposing the unit to be directly heated by the heating element, should such control be desired. The outer periphery 37 of the insulation layer or sheet is preferably bonded to the underside of plate 19 (as shown) to otherwise confine the heating element.

Thus, substantially all of the heat emitted by element 22 is absorbed by the plate 19, which distributes it more uniformly to provide an evenly heated area on top surface 21.

The beverage container 12 may be an ordinary ceramic or plastic cup having a flat bottom rim 38 to be evenly seated on the planar upper surface 21 of plate 19, with the exception that the side wall in a predetermined location such as directly below and in alignment with the cup handle 39 is provided with a downwardly open recess 40 in which is mounted a permanent magnet 41.

The location of reed switch 26 may be such that it will lie approximately in vertical alignment with the magnet 41 on a normal size coffee cup seated on surface 21. In the invention, cups are usually selected or made to conform accurately to this dimension, although the invention may be applied to adapt conventional cups and heater plates to associate similarly. As shown in FIG. 2, the reed switch 26 is in a predetermined location at one side of the assembly. The reed switch is of any known construction wherein the switching elements thereof assume closed-circuit condition when subjected to a predetermined magnetic force. Equivalent normally open magnetic switches may be used. The foregoing parts are so constructed and arranged that switch 26 will be closed only when the cup 12 is oriented to dispose magnet 41 at that side of plate 19 below which the switch 26 is mounted so that the switch is within the range of the magnetic field of magnet 41.

Should the cup 12 be oriented so as to dispose the magnet 41 at any other side of the plate 19, such as the top, bottom or the right (in the sense of FIG. 2), switch 26 will not respond to the magnetic field and will remain open.

In use of the invention, the beverage to be heated or maintained heated may be placed in the cup 12 which is oriented about its vertical axis until the magnet 41 is positioned over the left side of the plate 19, as viewed in FIG. 2. To guide the user, a colored or like visible index area 20 may be provided on the support to indicate the heat-energizing position of the container handle. This positional relation closes the switch 26 and thereby energizes heating element 22 and indicator lamp 28. The beverage is thereby heated. Should the heating temperature rise above a certain value, which for example would boil the beverage, a control 33 may act to at least temporarily open switch 32, thereby deactivating the circuit. A balanced condition at a predetermined temperature of plate 19 can be achieved.

Should the user find the beverage too warm, all he has to do is rotate the cup on surface 21 until the magnet no longer activates switch 26, and allow the beverage to cool.

FIGS. 6 to 11 illustrate the invention in another embodiment which differs mainly in the provision of a non-magnetic metal support plate for the cup, and in the respective locations of the magnet and the reed switch.

Figure 6:
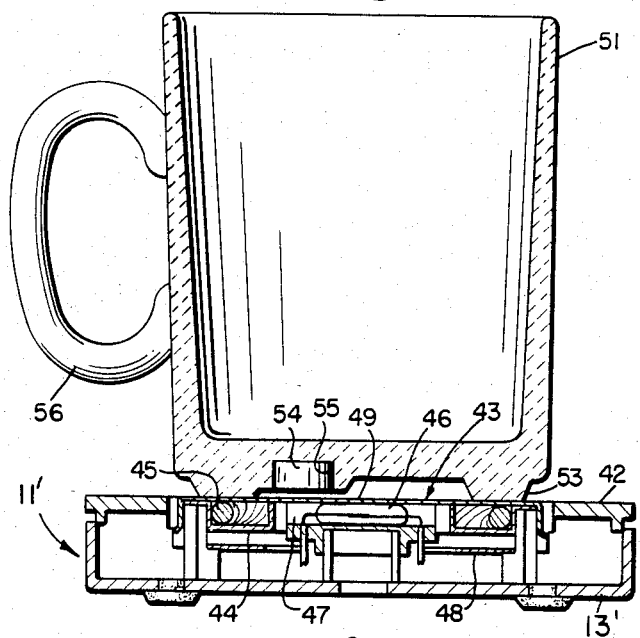
FIG. 6 is a section substantially at line 6—6 of FIG. 7, showing the invention according to another embodiment.
Figure 7:
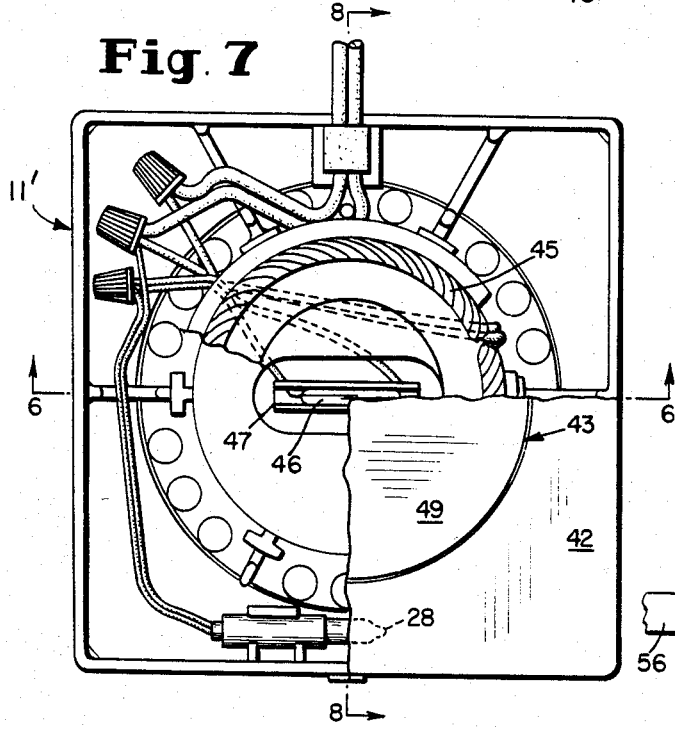
FIG. 7 is a plan view of the heating unit of FIG. 6, partly broken away to show one form of heater element and the location and orientation of a control switch for the heater element.
Figure 8:
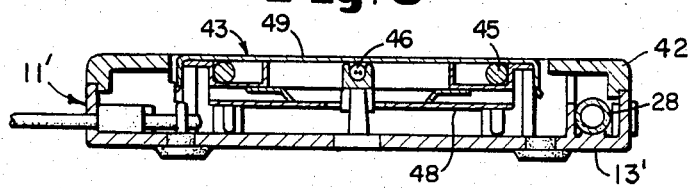
FIG. 8 is a section substantially on line 8—8 of FIG. 7, showing additional heating unit detail.

In this embodiment, the base 13' of heater-unit 11' has an annular cover 42 surrounding an inverted shallow cup-shaped support plate 43 for the beverage cup; cover 42 is shown to be square as viewed in plan (FIG. 7), but for visual-orientation recognition, two of its opposed outer edges are gently rounded (as seen in the section of FIG. 8) and the other two of its opposed outer edges are more sharply square (as seen in the section of FIG. 6). An annular heater housing 44 below plate 43 contains a suitable electrical heating element 45, here a so-called rope-type heater element, which comprises a flexible resistance-wire coil sheathed in a braided sleeve.

In this embodiment, the reed switch 46 is mounted in a central housing compartment 47 so that it is located below the central portion of the plate and about equidistant between opposite sides of the plate. The heater unit 45 and reed switch 46, which is normally open, are interconnected as in the circuit of FIG. 4. In this embodiment, no temperature responsive switch 32 is provided, but the warning light 28 is retained in the circuit.

Below the heater unit, a heat shield 48 extends across the housing interior, similarly to shield 35 of the FIG. 3 embodiment.

In this embodiment, the support plate 43 is of substantially unbreakable material and may be of non-magnetic metal, here an aluminum or aluminum alloy, or it may be of non-magnetic stainless steel. Preferably, it is a metal stamping sized for fitting over and closing the heater-unit housing. A stable smooth circular flat horizontal metal surface 49 thereby supports the container or cup 51.

It will be noted that the reed switch 46 is preferably oriented to extend substantially radially of the plate 43, and the base may also have two indicator bands, such as band 20 of FIG. 2, at diametrically opposite sides.

Figure 11:
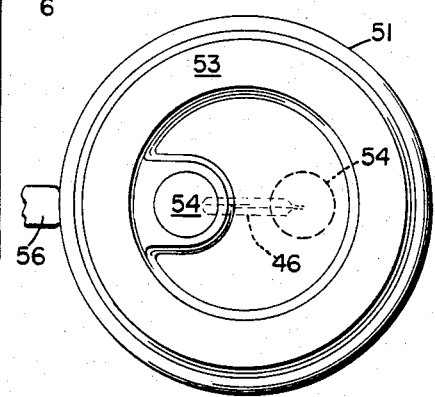
FIG. 11 is a bottom view of the cup of FIG. 6.

Cup 51, like cup 12, is non-magnetic, usually of ceramic or stiff plastic, and it has a flat lower rim 53 resting on surface 49. In cup 51, the permanent magnet 54 is fixed in a downwardly open cup-bottom recess 55 that is offset from the cup vertical axis in substantially radial alignment between the cup bottom-center portion and the handle 56, as shown in FIG. 11. In a normal-size coffee cup, the magnet may, for example, be about one-half inch off the center of the cup bottom. This arrangement is beneficial in that it provides two opposed cup positions where the magnet will operate the centered reed switch, as for example the full and dotted-line magnet locations shown in FIG. 11. This arrangement is beneficial and convenient for example to both right and left handed persons.

Figure 9:
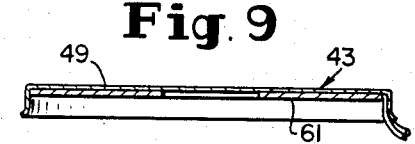
FIG. 9 is a section of a cup-support plate as used in the heating unit of FIG. 6 but illustrating an alternative heater element.
Figure 10:
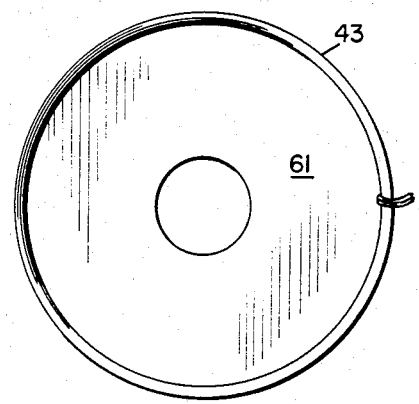
FIG. 10 is a bottom plan view of the plate of FIG. 9.

FIGS. 9 and 10 illustrate an alternate type of heater element usable in the embodiment of FIGS. 6 to 8. Here, the cup-shaped aluminum alloy plate 43 has an annular resistance-type heater element 61 of the etched-metal-foil type with silicon insulation attached adhesively to its bottom surface. This is a known type of heater per se and may equivalently heat the support plate.

Figure 13:
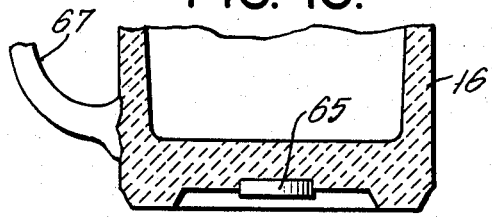
FIG. 13 is a fragmentary vertical section of the container unit of FIG. 12.

FIGS. 12 and 13 are illustrative of the fact that the permanent magnet element carried by the container unit, for example, for magnetic coaction with a centrally positioned switch (as in the case of the magnetic reed switch 46 of FIG. 6), need not be eccentrically positioned on the bottom of the container unit (as in FIGS. 6 and 11).

The magnetic-reed switch 46 of FIG. 6 may be viewed as having an elongation axis in the direction of its reeds, so that its elongation axis can be said to be horizontal, and in close proximity to the underside of the heat-transmitting support plate 43. The magnet element 54 of FIG. 6 is shown as a conventional commercially available short cylinder, and if it is polarized along its cylindrical axis, then it must be eccentrically located with respect to the container axis, in order to achieve the angular selectivity of switch (46) operation indicated in connection with FIGS. 6 and 11. If, on the other hand, the magnet element is polarized along a diameter, then it may be centrally mounted in the bottom of the container unit, as is the case of permanent magnet 65 in the bottom of container unit 66 in FIGS. 12 and 13. In FIG. 12, the legends N-S will be understood to designate such diametral polarization of magnet 65, the direction of horizontal polarization being taken to lie in the vertical plane of the container-unit axis and of the container handle 67. FIG. 12 additionally shows that when this horizontal polarization axis is generally parallel to and near the elongation axis of switch 46, the latter will be activated; thus, for such an orientation, switch 46 will close if it is of normally open variety and it will open if it is of normally closed variety. And the designations N'-S' of FIG. 12 will be understood to indicate that for container unit 66 oriented to position the polarization axis (and handle 67) in a 90-degree shifted position, the contacts of switch 46 will not be actuated so that its normal state continues, without ability to connect heater 45 to a source of electrical energy.

FIG. 14 illustrates another embodiment for so implementing the container unit 70 that it does not require permanent magnetization, in that requisite magnetization is embodied in the base unit, which may be the base unit 71 of FIG. 15, the base unit 72 of FIG. 16, or the base unit 73 of FIG. 17. Specifically, container unit 70 is shown with an elongated flat bar or armature 74 of magnetic-flux conducting material (such as a suitable ferrite or strip of soft iron) carried centrally of the bottom of the container unit and oriented with its longitudinal dimension in the vertical plane defined by the container-unit axis and by handle 75. The coacting base unit of FIG. 15 will be recognized as including the heat-transmitting plate 43 and heater element 45 as described for FIG. 6, but there are significant differences in that a permanent magnet element 76 is adhesively fixed to the underside of plate 43 at a first locale of plate 43, and another element 77 of unmagnetized magnetic-flux-conducting material is similarly fixed to another locale of plate 43. A magnetic-reed switch 46' may alternatively be positioned adjacent to the underside of plate 43 (i.e. in place of element 77), and with its elongation axis parallel to plate 43 and oriented transverse to the section plane of FIG. 15; however, I prefer that this transverse relation be applicable to the lower end face of element 77, so that switch 46' can be vertically offset below the heated plate 43 and heater 45. For the solid-line orientation shown in FIG. 14, armature 74 is seen to bridge the adjacent polarized pole face of magnet 76 and the upper-end face of element 77, thus establishing a polarized field that is operative to change the state of switch 46'; however, for the changed orientation suggested by dashed outline 74' of the armature, there is no such bridging and, therefore, no actuation of switch 46'.

In the base unit 72 of FIG. 16, plate 43 and heater components will again be recognized, but magnetic coaction with armature 74 involves a permanently magnetized core member 78 which is shown to be of generally C-shape and upwardly oriented with spaced "N" and "S" pole faces adhered to the underside of plate 43; the location and spacing of these pole faces will be understood to generally meet the description given for the spaced locales of elements 76 and 77 in FIG. 15, i.e. to be such that for the solid-line orientation of armature 74 (in FIG. 14), the latter bridges the polarized ends of core member 78, but in the changed armature orientation suggested by dashed outline 74', there is no such bridging. It will be noted that in shifting armature 74 into and out of its polebridging relation, the magnetic circuit of core element 78 and armature 74 (and the involved short air gaps) is successively closed and opened, being characterized by a low-reluctance circuit path when closed (solid-line outline 74, FIG. 14) and by a high-reluctance circuit path when open (dashed-line outline in FIG. 14). Use is made of this reluctance change, via a wire coil 80 coupled to core member 78 and electrically connected to control polarity-sensitive relay means 81, which determines whether or not the source of electrical energy will be connected to heater 45. More specifically, upon closure of the magnetic circuit (armature 74 establishing bridging relation to the pole faces of core member 78), an electrical pulse of first polarity is induced in coil 80 and is supplied to relay means 81, which is preferably of the latching variety; this first polarity will be understood to so actuate relay means 81 that its normally open condition is changed to a latched "closed" condition, thereby delivering source energy to heater 45. The latched "closed" condition will remain until a pulse of opposite polarity is induced in coil 80, an event that is characteristic of the act of opening the magnetic circuit. This opposite-polarity pulse will be understood to effectively trip the latch of relay means 81, thereby disconnecting heater 45 from the source.

The arrangement of FIG. 17 is as described for FIG. 16, except that the core member 78' is not permanently magnetized, but rather it is magnetized via dc source excitation of a polarizing coil 82. As shown, rectifier means 83 relies on a tapped connection to a household (ac) source, to provide the source of dc energy for polarizing winding 82. Induction of polarized signals in coil 80 is as described for FIG. 16, for on/off control of energy supplied to heater 45.

The foregoing embodiments will be seen to provide a safe, efficient mode of beverage warming. The user need not turn a manual switch on or off. Expensive spring supports for the heater plate which may corrode are eliminated. The support plate surface cannot be heated unless the properly oriented special container is on it, so that there is little danger of inadvertent burning or ignition of paper or the like that may contact the surface. If the container is inadvertently dislodged from the assembly, the heater is immediately automatically deenergized.

While the invention has been illustratively described for various embodiments, it will be understood that modifications may be made without departing from the claimed scope of the invention. For example, FIGS. 18 and 19 illustrate the fact that beverage-unit orientation on the base unit does not necessarily require selective angular orientation in order to achieve selective on/off control of heating through magnetic coaction between the respective units. In FIG. 18, a beverage unit 85 is shown having an annular armature element 86 of soft iron, suitable ferrite or other magnetic-flux conducting material, fixed to the bottom 87 and on the axis of unit 85, which may be a cup, with or without a handle or other indicium of angular orientation.

In FIG. 19, the heating plate 88 of the base unit for coacting with beverage unit 85 is seen to be generally rectangular with its shorter dimension adequate for full seating of the base rim of unit 85, and with its long dimension somewhat greater than its short dimension. The circular outlines 85A and 85B schematically indicate that beverage unit 85 may be selectively positioned (a) near one of the ends of the long dimension of plate 88, for the disconnected condition of a heating element (not shown), or (b) near the other end of the long dimension of plate 88, for the connected condition of the heating element, the latter being substantially concentric with the axis of unit 85 when in the 85B position.

The schematic indication 78' will be understood to show spaced poles "N" and "S" of a polarized core element 78', similar to core element 78 of FIG. 16, but with its poles positioned adjacent the underside of plate 88 so as to coact with armature element 86 essentially only when the beverage unit 85 is positioned at 85B, i.e., near one of the ends of the long dimension of plate 88. In its 86A position, armature element 86 cannot coact with core element 78', and there is therefore no heating of plate 88; but beverage-unit displacement of armature element 86 to its 86B position involves magnetic coaction as described for FIG. 16, for heating-element connection to the source connection 23 for supply of electrical energy.

What is claimed and desired to be secured by Letters Patent is:

1. A beverage warmer comprising electric-heater means having an electrically heated non-magnetic surface, an energizing electrical circuit for said means having a magnetically operable normally open switch mounted adjacent said surface in a predetermined location, and a non-magnetic beverage container having a closed bottom with a periphery adapted for stabilized removable mounting on said surface, said container having thereon a magnet near one to the exclusion of another region of said periphery, said switch being locally responsive to said magnet to close for a mounted condition of said container when said container is oriented to place said one region in operative proximity to said switch, and said switch being sufficiently non-responsive to said magnet to thereby remain open when said container is oriented to place said other region in proximity to said switch.

2. A beverage warmer comprising a support providing an upwardly facing non-magnetic heating surface, an electrical heating element disposed to heat said surface, an electrical energizing circuit for said element including a normally open magnetic switch mounted in a predetermined location on said support and below said surface, and a non-magnetic beverage container having a closed bottom with a periphery adapted for stabilized removable mounting on said surface, said container having a permanent magnet fixed in a lower portion thereof near one to the exclusion of another region of said periphery, said switch being locally responsive to said magnet to close for a mounted condition of said container when said container is oriented to place said one region in operative proximity to said switch, and said switch being sufficiently non-responsive to said magnet to thereby remain open when said container is oriented to place said other region in proximity to said switch.

3. The beverage warmer of claim 2, in which said support comprises a base mounting a horizontal plate member of non-magnetic material having an upper planar face serving as said heating surface, and means whereby said electrical element is secured adjacent the bottom of said member, said magnetic switch comprising a magnetic-reed-type switch mounted on the base below said member.

4. The beverage warmer of claim 2, in which said container is a cup having a flat bottom rim slidable on said surface and in which said magnet is fixed on the container bottom in offset relation to the central axis of said cup.

5. A beverage warmer comprising a support base mounting a horizontal plate member of non-magnetic material having an upper planar face serving as a heating surface, an electrical heating element secured adjacent the bottom of said plate member, an electrical energizing circuit for said element including a normally open magnetic-reed switch mounted on the base below said member substantially centrally thereof, and a non-magnetic beverage container adapted to rest on said surface, said container having a permenent magnet fixed in a lower portion thereof whereby to cause said switch to close to activate said circuit only when the container is oriented to dispose the magnet effectively adjacent said switch.

6. A beverage warmer comprising a support base mounting a horizontal plate member of non-magnetic material having an upper planar face serving as a heating surface, an electrical heating element secured adjacent the bottom of said member to heat said surface, an electrical energizing circuit for said element including a normally open magnetic reed switch mounted on said base below said member, a non-magnetic beverage container adapted to rest on said surface, said container having a permanent magnet fixed in the lower portion thereof whereby to cause said switch to close to activate said circuit only when the container is oriented to dispose the magnet effectively adjacent said switch, and visible index means on the upper part of said support facilitating operative orientation of said container.

7. A beverage warmer comprising a supporting base unit including a circular horizontal plate member of non-magnetic heat-conducting material, and a beverage container unit removably adapted for seating upon and heating via said member, said base unit further including electrical heating means mounted beneath and in heat-transfer relation with said plate member, and switch means operatively connected to said heating means and including magnetically coacting elements in each of said units, said elements being so mounted in the respective units that said switch means is operative to connect said heating means to an electrical source of energy for one angular relation of container-unit seating upon said plate member and is inoperative to so connect said heating means for an angularly offset relation of container-unit seating upon said plate member.

8. The beverage warmer of claim 7, in which said base unit includes an externally observable angular reference device external to the circle of said plate member, and in which said container unit includes an externally observable angularly local formation by which visual comparison can be made against said reference device, whereby it can be known from such visual observation whether or not said units are angularly oriented for excitation of said heating means.

9. A beverage warmer comprising a base unit including a horizontal plate member of non-magnetic heat-conducting material, and a beverage-container unit removably adapted for seating upon and heating via said plate member, said base unit further including electrical heating means mounted beneath and in heat-transfer relation with said plate member, switch means operatively connected to said heating means and including magnetically coacting elements in each of said units, said elements being so mounted in the respective units that said switch means is operative to connect said heating means to an electrical source of energy for one orientational relation of container-unit seating upon said plate member and is inoperative to so connect said heating means for a different orientational relation of container-unit seating upon said plate member, and said base unit including an indicator responsive to an excitational condition of said heating means.

10. The beverage warmer of claim 9, in which said indicator comprises a lamp mounted at the side of said base and adapted to be energized when said switch is closed.

11. A beverage warmer comprising a supporting base unit including a circular horizontal plate member of non-magnetic heat-conducting material, and a beverage-container unit removably adapted for seating upon and heating via said plate member, said base unit further including electrical heating means mounted beneath and in heat-transfer relation with said plate member, switch means operatively connected to said heating means, and actuating means for said switch means, said actuating means including magnetically coacting elements in each of said units, said elements being so mounted in the respective units that said switch means is operative to connect said heating means to an electrical source of energy for one angular relation of container-unit seating upon said plate member and is inoperative to so connect said heating means for an angularly offset relation of container-unit seating upon said plate member.

12. A beverage warmer comprising a base unit including a horizontal plate member of non-magnetic heat-conducting material, and a beverage-container unit removably adapted for seating upon and heating via said plate member, said base unit further including electrical heating means mounted beneath and in heat-transfer relation with said plate member, switch means operatively connected to said heating means, actuating means for said switch means, said actuating means including magnetically coacting elements in each of said units, said elements being so mounted in the respective units that said switch means is operative to connect said heating means to an electrical source of energy for one orientational relation of container-unit seating upon said plate member and is inoperative to so connect said heating means for a different orientational relation of container-unit seating upon said plate member, and said base unit including an indicator responsive to an excitational condition of said heating means.

13. A beverage warmer comprising a base unit including a horizontal plate member of non-magnetic heat-conducting material, and a beverage-container unit removably adapted for seating upon and heating via said plate member, said base unit further including electrical heating means mounted beneath and in heat-transfer relation with said plate member, switch means operatively connected to said heating means, actuating means for said switch means, said actuating means including magnetically coacting elements in each of said units, said elements being so mounted in the respective units that said switch means is operative to connect said heating means to an electrical source of energy for one orientational relation of container-unit seating upon said plate member and is inoperative to so connect said heating means for a different orientational relation of container-unit seating upon said plate member, and said base unit including an externally observable reference device locally external to said container unit when the latter is seated on said plate member, and said container unit including an externally local indicium by which visual comparison can be made against said reference device, whereby it can be known from such visual observation whether or not said units are oriented for switched connection of said heating means to the electrical source.

14. The beverage warmer of claim 13, in which said container unit is a cup with an angularly local handle, and in which said handle is said indicium.

15. The beverage warmer of claim 13, in which said base unit includes source-connection means at a single externally viewable side-edge location, and in which said source-connection means is said reference device.

16. The beverage warmer of claim 13, in which said base unit is of generally square outline when viewed in plan, whereby the periphery of said base unit is characterized by externally viewable first and second pairs of opposed generally parallel edges, the first pair having a visually recognizable different appearance than the second pair, and in which the visually recognizable appearance of one of said pairs is said reference device.

17. A beverage warmer comprising a support providing an upwardly facing non-magnetic heating surface, an electrical heating element disposed to heat said surface, an electrical energizing circuit for said element including a magnetic-reed switch having an axis of reed elongation and mounted in a predetermined location on said support with said elongation axis parallel to and below said surface, and a non-magnetic beverage container having a closed bottom with a periphery adapted for stabilized removable mounting on said surface, said container having a permanent magnet fixed centrally in a lower portion thereof, said permanent magnet being polarized on an axis parallel to the mounting plane of said bottom whereby said switch may be locally responsive to said magnet to close for a mounted condition of said container when said container is oriented to place said axis in generally parallel relation with said magnet in operative proximity to said switch, and said switch being sufficiently non-responsive to said magnet to thereby remain open when said container is oriented in said operative proximity but with said axis substantially divergent from said generally parallel relation.

18. A beverage warmer comprising a base unit including a horizontal plate member of non-magnetic heat-conducting material, and a beverage-container unit removably adapted for seating upon and heating via said plate member, said base unit further including electrical heating means mounted beneath and in heat-transfer relation with said plate member, a magnetic-reed switch operatively connected to said heating means, magnetically coacting elements in each of said units for activating said switch means; said magnetically coacting elements comprising an armature of magnetic-flux-conducting material fixed to the bottom of said beverage-container unit and spanning a single generally diametrical alignment between two spaced points on said bottom, and magnetic-flux-conducting core means fixedly carried by said base unit and establishing two oppositely poled regions near but beneath said plate member and spaced substantially to the extent of the span between said points, said core means including a path portion of relatively high reluctance between a permanent magnet and a gap containing said magnetic reed switch, whereby upon orientation of said units with said armature spanning said poled regions the core path reluctance to said gap reduces and said gap becomes polarized, thereby operating said switch for connection of said heating means to an electrical source of energy, and said switch being inoperative to so connect said heating means for an orientation of said units wherein said armature does not substantially span said poled regions.

19. A beverage warmer comprising a base unit including a horizontal plate member of non-magnetic heat-conducting material, and a beverage-container unit removably adapted for seating upon and heating via said plate member, said base unit further including electrical heating means mounted beneath and in heat-transfer relation with said plate member, a magnetic-reed switch operatively connected to said heating means, magnetically coacting elements in each of said units for activating said switch means; said magnetically coacting elements comprising an armature of magnetic-flux-conducting material fixed to the bottom of said beverage-container unit and spanning a single generally diametrical alignment between two spaced points on said bottom, first means including a permanent magnet fixed to said base unit and establishing a magnetic pole near but beneath said plate member at a first locale of said plate member, and second means fixed to said base unit and near but beneath said plate member at a second locale of said plate member, said second locale being spaced from said first locale substantially to the extent of the span between said points, and said second means establishing a magnetic-flux-conducting path to said switch when said container unit is so positioned on said plate member as to bridge said first and second locales, whereby upon orientation of said units with said armature bridging both said locales, the polarization of said magnet is transmitted via said armature to operate said switch for connection of said heating means to an electrical source of energy, and said switch is inoperative to so connect said heating means for an orientation of said units wherein said armature does not substantially bridge said locales.

20. The beverage warmer of claim 19, in which said second means positions said switch adjacent said plate member at said second locale.

21. The beverage warmer of claim 19, in which said switch is positioned at offset from said plate and in which an element of magnetic-flux-conducting material fixed to said base unit establishes and flux-conducting path from said second locale to said switch.

22. A beverage warmer comprising a base unit including a horizontal plate member of non-magnetic heat-conducting material, and a beverage-container unit removably adapted for seating upon and heating via said plate member, said base unit further including electrical heating means mounted beneath and in heat-transfer relation with said plate member, switching means operatively connected to said heating means and activating means for said switching means, said activating means including magnetically coacting core-path members in each of said units; said coacting members comprising an armature element of magnetic-flux-conducting material fixed to the bottom of said beverage-container unit and spanning two spaced points on said bottom, and a core element of magnetic-flux-conducting material fixedly carried by said base unit and characterized by separate pole faces near but beneath two plate-member locales which are spaced substantially to the extent of the space between said points, one of said coacting core-path members being permanently polarized, whereby a change in core-path reluctance accompanies completion or disruption of a core-path circuit via both said members, said switching means including means inductively coupled to said base-unit core-path member and responsive only to a single polarity of induced signal to connect said heating means to an electrical source.

23. The beverage warmer of claim 22, in which the permanently polarized core-path member is the base-unit core-path member.

24. The beverage warmer of claim 22, in which said switching means is responsive to an opposite polarity of induced signal to disconnect said heating means from the electrical source.

25. The beverage warmer of claim 22, in which in response to an opposite-polarity induced signal, said switching means is inoperative to connect said heating means to an electrical source.

26. A beverage warmer comprising a base unit including a horizontal plate member of non-magnetic heat-conducting material, and a beverage-container unit removably adapted for seating upon and heating via said plate member, said base unit further including electrical heating means mounted beneath and in heat-transfer relation with said plate member, switching means operatively connected to said heating means and actuating means for said switching means, said actuating means including magnetically coacting core-path members in each of said units; said coacting members comprising an armature element of magnetic-flux-conducting material fixed to the bottom of said beverage-container unit and spanning two spaced points on said bottom, and a core element of magnetic-flux-conducting material fixedly carried by said base unit and characterized by separate pole faces near but beneath two plate-member locales which are spaced substantially to the extent of the space between said points, means polarizing the core-path member of said base unit, the container-unit core-path member being unpolarized, whereby a change in core-path reluctance accompanies completion or disruption of a core-path circuit via both said members, said switching means including means inductively coupled to said base-unit core-path member and responsive only to a single polarity of induced signal to connect said heating means to an electrical source.

27. The beverage warmer of claim 26, in which said polarizing means is a permanently magnetized condition of at least a portion of the core-path member of said base unit.

28. The beverage warmer of claim 26, in which said polarizing means includes an electrical coil coupled to the core-path member of said base unit and in which said coil includes a dc excitation connection.

29. A beverage warmer assembly comprising a base unit including a horizontal plate member of non-magnetic heat-conducting material, and a beverage-container unit removably adapted for seating upon and heating via said plate member, said base unit further including electrical heating means mounted beneath and in heat-transfer relation with said plate member, switch means operatively connected to said heating means, actuating means for said switch means, said actuating means including magnetically coacting elements in each of said units, said elements being so mounted in the respective units that said switch means is operative to connect said heating means to an electrical source of energy for one orientational relation of container-unit seating upon said plate member and is inoperative to so connect said heating means for a different orientational relation of container-unit seating upon said plate member.

30. The beverage warmer of claim 29, in which said plate member is circular, and in which a rotational displacement is involved as between the orientational relations identified with the respective operative and inoperative conditions of said switch means.

31. The beverage warmer of claim 29, in which said plate member is elongate to the extent of establishing a length dimension which is recognizably greater than a width dimension, the magnetically coacting elements involving a base-unit element which is located nearer to one than to the other end of the length dimension of said plate member, whereby the magnetic coaction is operative only when said beverage-container unit is positioned near said one end of said plate member, and further whereby at least a rectilineal displacement is involved as between the orientational relations identified with the respective operative and inoperative conditions of said switch means.

32. The beverage warmer of claim 29, in which said switch means is a magnetic-reed-type switch (a) which is operative to so connect said heating means for said one orientational relation and (b) which is inoperative to so connect said heating means for said different orientational relation.

33. The beverage warmer of claim 29, (a) in which said switch means is a polarity-sensitive relay, (b) in which said magnetically coacting elements establish a first core-path reluctance for said one orientational relation and a different core-path reluctance for said different orientational relation, and (c) in which means including an electrical winding inductively coupled to the coacting magnetic element of said base unit is operatively connected to said relay.

* * * * *